Nov. 25, 1958   R. L. MORSE   2,861,837
FRAMELESS DUMPING TRAILER SUPPORT STABILIZING MEANS
Original Filed Oct. 2, 1956   3 Sheets-Sheet 1
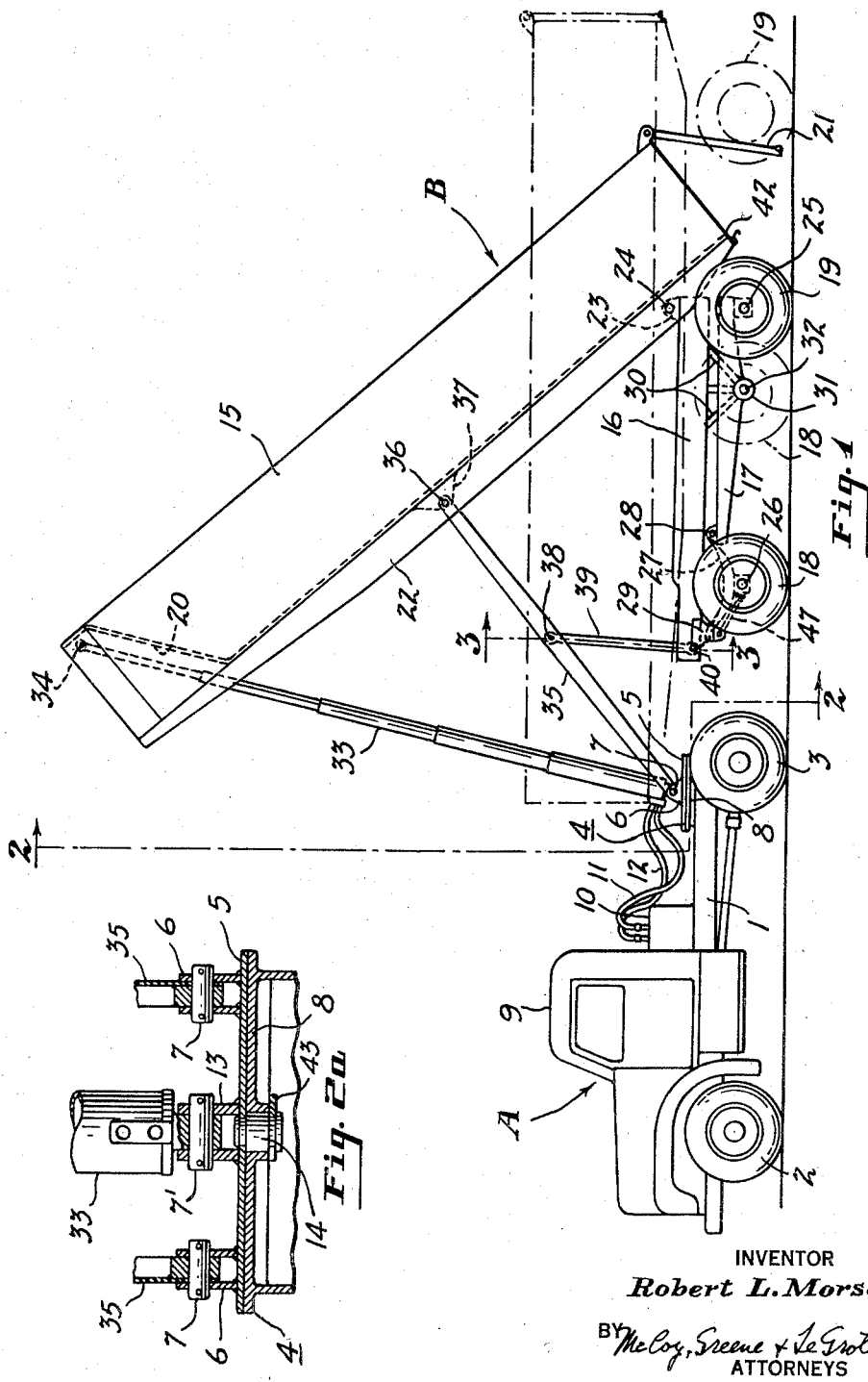
INVENTOR
*Robert L. Morse*
BY McCoy, Greene + LeGrotenhuis
ATTORNEYS Nov. 25, 1958 R. L. MORSE 2,861,837
FRAMELESS DUMPING TRAILER SUPPORT STABILIZING MEANS
Original Filed Oct. 2, 1956 3 Sheets-Sheet 2

INVENTOR
*Robert L. Morse*
BY McCoy, Greene + Le Grotenhuis
ATTORNEYS

Nov. 25, 1958 R. L. MORSE 2,861,837
FRAMELESS DUMPING TRAILER SUPPORT STABILIZING MEANS
Original Filed Oct. 2, 1956 3 Sheets-Sheet 3

INVENTOR
Robert L. Morse
BY McCoy, Greene & te Grotenhuis
ATTORNEYS

United States Patent Office 2,861,837
Patented Nov. 25, 1958

2,861,837

FRAMELESS DUMPING TRAILER SUPPORT STABILIZING MEANS

Robert L. Morse, Shaker Heights, Ohio, assignor of one-half to Julius L. Glick, Shaker Heights, Ohio Original application October 2, 1956, Serial No. 613,435. Divided and this application May 15, 1958, Serial No. 736,659

3 Claims. (Cl. 298—20)

The present invention relates to a dumping semi-trailer and more particularly to a semi-trailer of improved construction having a high spill point and having means to prevent lifting of the front portion of the trailer frame away from the ground.

Heretofore dumping semi-trailers have been constructed so that the front portion of the trailer frame moved away from the ground and the spill point moved toward the ground as the load-carrying dump body was tilted vertically to effect dumping. The lowering of the spill point made it difficult to empty the dump body; and, in tandem axle trailers, tilting of the trailer frame below the dump body raised the front wheels of the trailer off the ground whereby the trailer was unstable during dumping.

According to the present invention a dumping semi-trailer is provided having a wheel assembly, a trailer frame, and a vertically tiltable dump body pivotally mounted on the frame to swing vertically about a transverse horizontal axis near the rear of said frame, said frame being mounted on the wheel assembly to swing about a horizontal axis. The semi-trailer is movably connected to the tractor or towing vehicle by a fifth wheel assembly or the like and a draft member which is pivotally connected at its forward end to the upper fifth wheel and at its rear end to the dump body. Means is provided for lifting the front portion of the dump body and for causing the ground-engaging portions of the tractor and the trailer to move toward each other, and means is provided on the trailer for exerting a force on the dump body in a direction to elevate the front end thereof and for exerting a force on the trailer frame in a direction to lower the front end of said frame and to prevent lowering of the pivotal axis of the dump body so that the lowering of the spill point is minimized during dumping. The wheel assembly supporting the trailer frame may include single or tandem axles, and means may be provided for lowering the front end of the trailer frame so as to elevate the pivotal axis of the dump body substantially as the front end of the dump body is elevated during dumping. The means for tilting the trailer may comprise screws, chains, cables or the like for pulling the tractor and trailer toward each other or an external separate hoist or other means acting directly on the front of the dump body to raise the same.

It is preferable to provide front and rear sets of wheels for the semi-trailer particularly where the loads to be carried are heavy and are to be transported for considerable distances. According to the present invention a tandem-axle semi-trailer is provided with an upper trailer frame that is pivotally connected to the dump body and a lower trailer frame or subframe for connection to the wheels of the trailer. A plurality of leaf springs are mounted on the front trailer axle and are connected at their rear ends to the front end portion of the subframe and at their front ends to the front end portion of the upper trailer frame. Means is provided for pivotally connecting the upper frame to the subframe for tilting movement about a transverse horizontal axis parallel to and forwardly of the pivotal axis of the dump body. The rear trailer axle is not provided with springs but is connected to the rear end portion of the subframe, the construction of the trailer being such that adequate cushioning is provided by the springs on the front axle of the trailer.

Means is provided between the dump body and the upper trailer frame for exerting a force on said upper frame that holds the front wheels of the trailer on the ground during dumping whereby such front wheels stabilize the trailer. Said means also prevents substantial downward movement of the horizontal pivotal axis of the dump body so that lowering of the spill point during dumping is minimized. If desired, such means may actually elevated said pivotal axis substantially above its normal position when the dump body is lowered to a normal substantially horizontal position for towing.

The means for holding the front trailer wheels against the ground may be a motor-operated toggle joint or other motor-operated means, such as a telescoping multicylinder hoist, or may be link means of various types. A simple way to hold the front trailer wheels against the ground is to provide a supplementary link means between the central portion of the draft link that connects the tractor and the dump body and the front portion of the upper trailer frame for exerting a downward force on the trailer frame in response to dumping of the trailer. It will be apparent that many different means may be employed to prevent tilting of the trailer frame and/or to raise the spill point during tilting of the dump body without departing from the spirit of the invention.

An object of the present invention is to provide a large dumping semi-trailer of simple inexpensive construction having an excellent dumping action.

A further object of the present invention is to provide an improved dumping semi-trailer having tandem axles.

A still further object of the present invention is to provide a dumping semi-trailer having a high spill point so that the material may be unloaded easily from the trailer.

Another object of the invention is to provide a tandem axle semi-trailer having front and rear wheels which remain on the ground during dumping to provide greater stability.

Other objects, uses and advantages of the present invention will become apparent to those skilled in the art from the following description and claims, and from the drawings, in which:

Figure 1 is a side elevational view on a reduced scale showing a dumping semi-trailer connected to a tractor or towing vehicle, the trailer being shown in solid lines at its maximum inclination during dumping and in dot-dash lines in its normal horizontal towing position;

Figure 2a is a fragmentary view similar to Fig. 2 and in section showing details of the fifth-wheel assembly on a larger scale;

Figure 4:
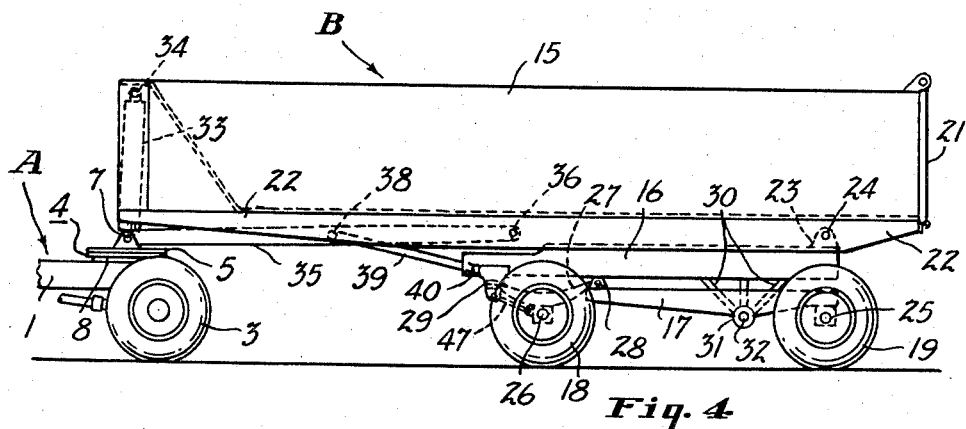
Figure 4 is a fragmentary side elevational view of the truck and semi-trailer on a reduced scale showing the normal position of the parts during towing of the trailer.

Referring more particularly to the drawings, which are drawn substantially to scale and in which like parts are identified by the same numerals through the several views, Figs. 1 to 4 show a tractor or towing vehicle A and a dumping semi-trailer B constructed according to the present invention. The tractor A is generally of conventional construction and includes a metal frame 1, supported by front and rear wheels 2 and 3. A fifth wheel assembly 4 is mounted on the rear portion of the frame 1 to provide a connection between the tractor and trailer and includes a flat upper fifth wheel or turntable 5 having a plurality of vertically extending ears or brackets 6, which provide a support for a pair of aligned horizontal pivot shafts 7, and a lower fifth wheel 8 rigidly connected to the frame 1 and having a flat upper surface. The turnplate 5 is pivotally mounted on the lower fifth wheel 8 for turning about a vertical axis by means including a vertical kingpin 14 which fits in a circular opening at the center of the plate 5 and in an internally cylindrical central recess in the stationary member 8 as is apparent in Fig. 2a. A bracket 13 is rigidly mounted on the plate 5 above the kingpin 14 and supports a horizontal pivot shaft 7' coaxial with the shafts 7. The assembly 4 is spaced rearwardly from the tractor cab 9 a substantial distance so that there is ample room for a tank 10 containing a hydraulic pump or other source of pressure between said cab and said assembly, flexible conduits 11 and 12 being provided to convey hydraulic fluid from the pump to and from the hydraulic hoist 33 as will be hereinafter described.

The semi-trailer B includes a generally rectangular vertically tiltable dump body 15, an upper trailer frame 16 pivotally connected to said dump body, a trailer subframe 17 pivotally connected to the frame 16, and front and rear wheels 18 and 19 for supporting the trailer. The turnplate or foot member 5 is also part of the trailer B and may be detached from the tractor by removing the clamp 43 from the circumferential groove of the pin 14. The dump body 15 is of generally rectangular shape, has a recess 20 at its front end for receiving the hoist, and has a conventional tail gate 21 at its rear end. The bottom portion of the dump body is reinforced by a pair of parallel longitudinal beam members 22 which are rigidly connected to the dump body and extend substantially the full length of the semi-trailer. The trailer frame member 16 has ears or brackets 23 which support a horizontal pivot shaft 24 so as to provide a pivotal connection between said frame member and the rear portion of said dump body 15. It will be apparent from the drawings how the dump body 15 is supported by the wheels 18 and 19 and the remainder of the wheel assembly.

Figure 5:
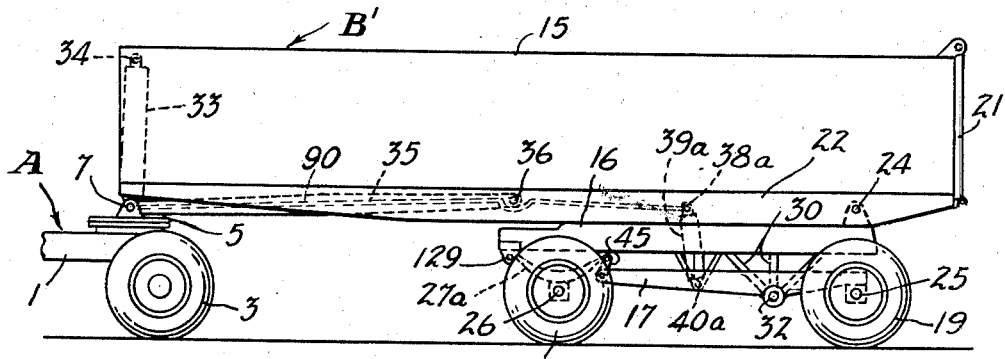
Figure 5 is a fragmentary side elevational view on a reduced scale showing a modified form of semi-trailer according to the present invention.
Figure 6:
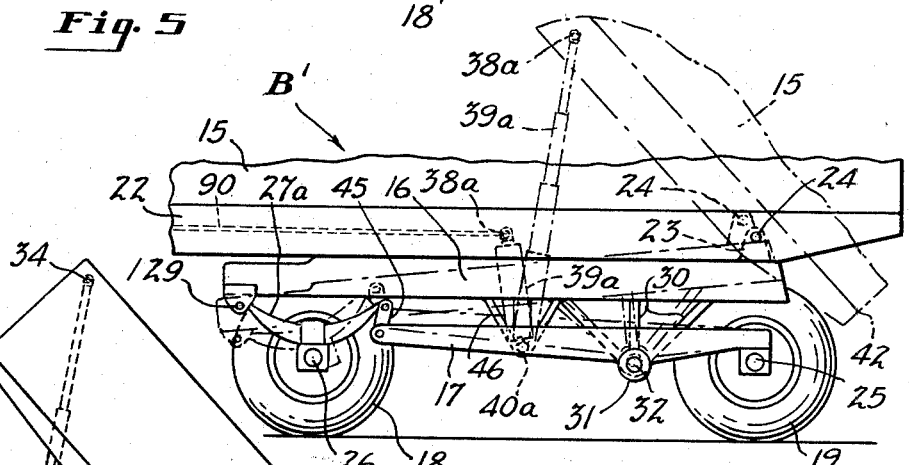
Figure 6 is a fragmentary side elevational view showing a portion of the semi-trailer of Fig. 5 on a larger scale, the parts being shown in solid lines in their normal traveling position and in dot-dash lines in their position during dumping.
Figure 7:
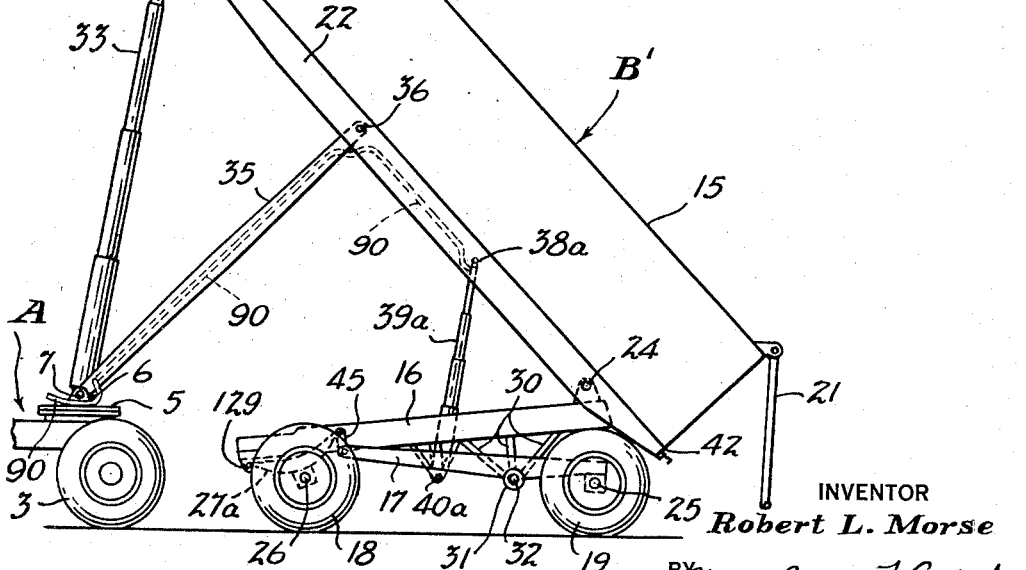
Figure 7 is a fragmentary side elevational view on a reduced scale showing the truck and semi-trailer of Figs. 5 and 6 in their position during dumping.

The rear axle 25 of the wheel assembly is mounted at the rear end of the subframe 17 and the front axle 26 is mounted at the center of the front springs 27 a short distance forwardly of the subframe, conventional pivotal connections being provided at 28 and 29 on each side of the trailer between the springs 27 and the frame members 16 and 17. As herein shown, one multiple-leaf spring 27 is located on each side of the trailer. One of the pivotal connections for each spring may be a link connection, for example, as shown in Figs. 5 to 7, but as herein shown a floating connection is provided at 29 on each side of the trailer. A short link 47 is provided on each side of the trailer below the spring 27 to connect the front axle 26 to the front portion of the frame member 16. As herein shown said link 47 is pivotally connected at its rear end to the axle 26 and is pivotally connected at its front end to the box-like metal member at 29 which surrounds the front end portion of the spring 27. Rigidly mounted on the lower rear portion of the frame member 16 are a series of downwardly projecting arms 30 leading to a boss 31. A horizontal pivot shaft 32 extends through bosses carried by the frame member 17 and the arms 30 to provide a pivotal connection between the frame member 16 and the subframe 17, the shaft 32 being parallel to the shaft 24 and the axles 25 and 26. The arrangement of the frame members 16 and 17 and the springs 27 is such that the springs 27 cushion all the up and down movements both at the front and rear of the frame member 16 so that it is unnecessary to provide additional springs above the rear axle 25.

An extensible five-cylinder hydraulic hoist 33 is provided to effect dumping of the semi-trailer B. The several pistons and cylinders of said hoist are telescopically connected in a conventional manner, the lower cylinder being pivotally connected at its lower end to the turntable 5 by the horizontal pivot shaft 7' and the upper cylinder being pivotally connected to the dump body 15 at its upper end by a horizontal pivot shaft 34 parallel to the pivot shaft 24 and the axle 25.

Figures 2, 3:
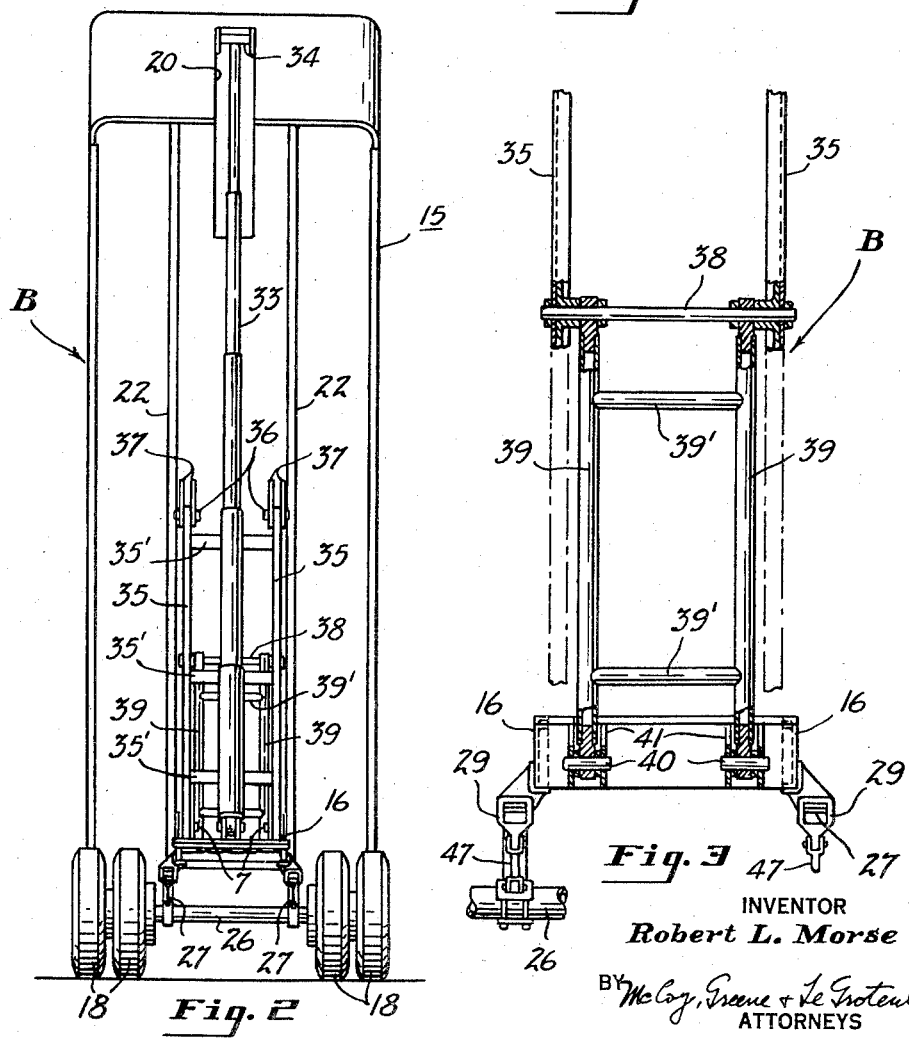
Figure 2 is a front elevational view of the trailer taken substantially on the line 2—2 of Fig. 1 and on a larger scale.
Figure 3 is a fragmentary front elevational view with parts broken away and shown in section, taken substantially on the line indicated at 3—3 in Fig. 1 and on a larger scale.

A draft connection is provided between the tractor A and the semi-trailer B including a draft link having laterally spaced parallel beams 35 rigidly connected by bracing bars 35'; the ends of said beams being pivotally connected to the tractor and the trailer. The forward ends of the beams 35 are pivotally connected to the turntable 5 by the shafts 7 and the rear ends of said beams are pivotally connected to the dump body 15 between the parallel beams 22 by aligned pivot shafts 36, said shafts being carried by vertical gusset plates or brackets 37 and held parallel to the shafts 24, 32 and 34. A long horizontal central shaft 38 is mounted between the side beams 35 of the draft link, as best shown in Fig. 3, almost half way between the shafts 7 and 36 and parallel to said shafts.

A supplementary link is provided comprising laterally spaced parallel bars 39 rigidly connected by horizontal bracing bars 39'. The bars 39 are pivotally mounted at their upper ends on the shaft 38 and at their lower ends on coaxial shafts 40 parallel to the shaft 38. The shafts 40 are carried by vertical gusset plates or brackets 41 welded to the upper trailer frame member 16 at the front end thereof. The link 39, therefore, provides a connection between the central portion of the link 35 and the front end portion of the frame member 16. The lengths of the links 35 and 39 and the largest outermost cylinder of the hoist 33 are selected so that the dump body 15 may be lowered to a horizontal position substantially as shown in Fig. 4.

When it is desired to empty the semi-trailer B, the truck is stopped and hydraulic fluid is pumped from the source 10 to the piston-cylinder motor or hoist 33 so as to cause vertical axial extension of the hoist. This lifts the front end of the dump body 15, and the draft link 35 causes relative horizontal movement between the tractor A and the trailer frame 16. Where the draft link 35 is employed, it will be apparent that the dumping of the body 15 may be effected by means other than the hoist 33; for example, by providing chains, screws, cables or other means to pull the wheels 3 and 18 toward each other or by providing a screw, a jack or a separate external hoist to elevate the front end of the dump body 15 directly. However, a multicylinder hoist such as employed at 33 is a preferred construction.

The purpose of the link 39 is to limit movement of the front trailer wheels 18 away from the ground when the dump body 15 is tilted to empty the trailer. The link 39 preferably has a length sufficient to hold the front end portion of the frame member 16 in its lowermost position or against a stop and to hold the front wheels 18 against the ground at all times during the dumping operation so that such wheels stabilize the trailer during dumping. By holding the wheels 18 against the ground, the spill point 42 is prevented from moving too close to the ground as would be the case if the upward movement of the wheels 18 were not prevented. If desired, the trailer may be constructed and the length of the link 39 may be selected so that the front end of the frame member 16 is forced downwardly several inches below its normal position during travel of the truck whereby the spill point 42 tends to be elevated by tilting of the frame 16 about its axis at 32. A high spill point is very desirable in any dump truck, as will be apparent to those skilled in the art.

Figures 5 to 7 show a modified form of the present invention wherein the supplementary link 39 is omitted and is replaced by a supplementary multi-telescoping-cylinder hydraulic motor or hoist 39a which holds the front wheels of the semi-trailer B¹ against the ground during dumping. The dumping semi-trailer B¹ is the same as the semi-trailer B described above except that the supplementary link 39 is replaced by a hoist assembly and the springs for the trailer are connected in a slightly different manner to permit tilting of the upper frame member 16 to a greater extent. The multi-telescoping-cylinder hydraulic hoist 33 is connected to the tractor A by the pivot shaft 7' and is connected to the dump body 15 by the pivot shaft 34. The draft link of the trailer B¹ is pivotally connected at its forward ends to the tractor A by the aligned horizontal pivot shafts 7 and is pivotally connected at its rearward ends to the dump body 15 by the aligned horizontal pivot shafts 36 so that the dump body is pulled forwardly toward the tractor as the front end thereof is raised by the hoist 33. The dump body 15 of the trailer B¹ is pivotally mounted on the upper frame 16 by the horizontal pivot shaft 24, and the subframe 17 is pivotally mounted on the frame member 16 by the horizontal pivot shaft 32 as in the trailer B. The rear end portion of the subframe 17 is mounted on the rear axle 25 and the front end of said subframe is pivotally connected at the opposite sides of the trailer to the lower ends of a pair of short links 45 as best shown in Fig. 6 wherein the wheels 18 and 19 on the near side have been omitted. The upper ends of said links are pivotally connected to the rear ends of two conventional multiple-leaf springs 27a which are located on opposite sides of the trailer and which are connected midway between their ends to the front axle 26 in a conventional manner like the springs 27 described above. The front ends of the springs 27a are connected to the lower front end portion of the frame member 16 at 129 by aligned horizontal pivot shafts mounted on brackets carried by said frame member. The pivot shafts at 129 and the links 45 permit substantial tilting of the upper frame member 16 from the normal horizontal traveling position shown in solid lines in Fig. 6 to the position shown in dot-dash lines in that figure.

The stabilizing link 39 of Figs. 1 to 4 is replaced in the trailer B¹ by the hoist 39a which functions like said link to exert a downward force on the upper frame member 16 tending to hold the front wheels 18 against the ground and to raise the spill point 42. The upper cylinder of the fluid pressure motor 39a is pivotally connected to the dump body 15 by a horizontal pivot shaft 38a parallel to and located between the pivot shafts 24 and 36. The axis of the hoist 39a is preferably inclined only slightly relative to the vertical. The hoist may be located near the front of the frame member 16 but is preferably located near the center of said frame member so that its length may be reduced. The lower cylinder of the hoist is pivotally connected to the frame member 16 by a horizontal pivot shaft 40a parallel to the shafts 24, 32 and 36.

The shaft 40a may be located below the subframe 17 to accommodate the hoist 39a when the dump body is lowered to its normal horizontal position. As herein shown the pivot shaft 40a is carried by a boss and arms 46 which are welded to said boss and to the bottom of the beam member 16. As herein shown only one hoist 39a is provided substantially midway between the opposite sides of the trailer, but it will be understood that a pair of hoists could be employed, one on each side of the trailer.

A separate source of hydraulic fluid under pressure may be provided on the trailer B¹ but it is preferable to supply the hydraulic fluid for the hoist 39a from the same source 10 which supplies the hoist 33, suitable connections being provided between the tractor and the trailer for this purpose. As herein shown, a conduit 90 is provided for supplying the hydraulic fluid from the tractor to the hoist 39a. When fluid under pressure is supplied to the main hoist 33 of the trailer B¹ to elevate the front end of the dump body, fluid under pressure is supplied simultaneously to the hoist 39a which presses upwardly against the shaft 38a and downwardly against the shaft 40a to prevent raising of the front end of the frame member 16.

The action of the hoist 39a prevents lowering of the pivotal axis at 24 and minimizes lowering of the spill point 42 during dumping. The hoist also holds the wheels 18 firmly against the ground throughout dumping even when the dump body 15 is elevated to an angle greater than 30° or to its maximum elevation as indicated in Fig. 7. The engagement of the wheels 18 with the ground during dumping stabilizes the trailer and minimizes the stresses on the hoist 33 and the draft means 35. If desired, sufficient pressure may be supplied to the hoist 39a during dumping to lower the front end of the upper frame member 16 and to raise the pivotal axis at 24 several inches above its normal traveling position. When the dump body is elevated to the maximum height, the upper frame member 16 may be tilted substantially by the downward force from hoist 39a and the shaft 24 may be raised substantially above its normal position shown in solid lines in Fig. 7 to an elevated position as shown in dot-dash lines in Fig. 6, the normal traveling position of the parts of the trailer being shown in solid lines in Fig. 6.

This application is a division of my copending application Serial No. 613,435, filed October 2, 1956.

It will be understood that the above description is by way of illustration rather than limitation and that, in accordance with the provisions of the patent statutes, variations and modifications of the specific devices disclosed herein may be made without departing from the spirit of the invention.

Having described my invention, I claim:

1. A dumping semi-trailer for use in combination with a tractor having a fifth wheel support plate comprising a tiltable dump body, a trailer frame pivotally connected at its rear end to the rear portion of said dump body on a first horizontal axis transverse of the dump body, a frame supporting wheel assembly and suspension means connected to said frame, said frame being mounted to swing about a second horizontal axis parallel to and spaced forwardly of said first horizontal axis, a turnplate mounted on said fifth wheel support plate, a draft link pivotally connected at its forward end to said turnplate and pivotally connected at its rear end to an intermediate portion of said dump body, elevating means for raising said dump body, and means for exerting sufficient downward force on the forward end of said trailer frame to raise said first horizontal axis during dumping which comprises a vertically extensible fluid pressure motor having a series of telescopically connected cylinders, the lowermost of said cylinders being pivotally connected at its lower end to said frame forwardly of said horizontal axes, the uppermost of said cylinders being pivotally connected at its upper end to said dump body.

2. A dumping semi-trailer for use in combination with a tractor having a fifth wheel support plate comprising a tiltable dump body member, a trailer frame pivotally connected at its rear end to the rear portion of said dump body on a first horizontal axis transverse of the dump body, a frame supporting wheel assembly and suspension means connected to said frame, said frame being mounted to swing about a second horizontal axis parallel to and spaced forwardly of said first horizontal axis, a turnplate mounted on said fifth wheel support plate, a draft link member pivotally connected at its forward end to said turnplate and pivotally connected at its rear end to an intermediate portion of said dump body, elevating means for raising said dump body, and hydraulically actuated hold-down means connected to one of said members and to said trailer frame forwardly of said second horizontal axis, said hold-down means exerting force on said trailer frame as the dump body is elevated so as to prevent said first horizontal axis from being lowered substantially during dumping.

3. A dumping semi-trailer for use in combination with a tractor having a fifth wheel support plate comprising a tiltable dump body, a trailer frame pivotally connected at its rear end to the rear portion of said dump body on a first horizontal axis transverse of the dump body, a frame supporting wheel assembly and suspension means connected to said frame, said frame being mounted to swing about a second horizontal axis parallel to and spaced forwardly of said first horizontal axis, a turnplate mounted on said fifth wheel support plate, a draft link pivotally connected at its forward end to said turnplate and pivotally connected at its rear end to an intermediate portion of said dump body, elevating means for raising said dump body, and means for exerting a downward force on the forward end of said trailer frame which comprises a vertically extensible fluid pressure motor having a series of telescopically connected cylinders, the lowermost of said cylinders being pivotally connected at its lower end to said frame forwardly of said horizontal axes, the uppermost of said cylinders being pivotally connected at its upper end to said dump body.

References Cited in the file of this patent

UNITED STATES PATENTS

| | | |
|---|---|---|
| 2,148,798 | Barrett | Feb. 28, 1939 |
| 2,309,787 | Quintin et al. | Feb. 2, 1943 |
| 2,449,202 | Day | Sept. 14, 1948 |
| 2,539,086 | Kirksey | Jan. 23, 1951 |
| 2,635,919 | Watson | Apr. 21, 1953 |
| 2,661,236 | Schonrock | Dec. 1, 1953 |
| 2,775,480 | Brasswell | Dec. 25, 1956 |